United States Patent [19]

Baker

[11] 3,796,824

[45] Mar. 12, 1974

[54] TV AFC CIRCUIT ELIMINATES BIASED DIODES FOR SYMMETRICAL PULL-IN

[75] Inventor: Roy F. Baker, Franklin Park, Ill.

[73] Assignee: Zenith Radio Corporation, Chicago, Ill.

[22] Filed: Jan. 26, 1972

[21] Appl. No.: 220,913

[52] U.S. Cl. .......... 178/5.8 AF, 325/422

[51] Int. Cl. .......... H04n 5/44, H04b 1/16

[58] Field of Search ...... 178/5.8 R, 5.8 AF; 331/17, 331/26, 28, 36 R, 36 C; 325/420, 422, 423, 346, 349, 487, 418, 419, 421; 307/295, 237, 296

[56] References Cited

UNITED STATES PATENTS

| | | | |
|---|---|---|---|
| 2,995,654 | 8/1961 | Korver | 325/422 |
| 3,459,887 | 8/1969 | Baker | 178/5.8 R |
| 3,519,851 | 7/1970 | Groner | 307/237 |

*Primary Examiner*—Robert L. Richardson
*Attorney, Agent, or Firm*—Nicholas A. Camasto; John J. Pederson

[57] ABSTRACT

The automatic frequency control (AFC) system of a television receiver includes a discriminator network and a pair of non-biased rectifier arrangements with load circuits, operating over a small range of frequency deviations centered about the desired mean frequency. The rectifier arrangements are non-biased for compatibility with varactor tuning systems and include three serially connected diodes in one of the rectifier arrangements and a single diode in the other to achieve extended pull-in. The three serially connected diodes vary the conduction threshold of the positive portion of the discriminator network to assure proper shaping of the frequency response characteristic of the FM detector. Accordingly, for conditions of gross mistuning, control voltages are obtained from the two rectifier arrangements that are of the same polarity and aid one another in obtaining an augmented frequency correcting effect.

9 Claims, 6 Drawing Figures

TV AFC CIRCUIT ELIMINATES BIASED DIODES FOR SYMMETRICAL PULL-IN

BACKGROUND OF THE INVENTION

The present invention is directed to improvements in an automatic frequency control (AFC) system for television receivers.

The general concept of AFC for a superheterodyne receiver is certainly well known in the art and has been adapted to sound receivers as well as to television receivers of both the monochrome and color variety. The general purpose of such a system is to assist the user in attaining proper tuning of the receiver without requiring critical manual adjustment. The advantage of such a system is self-evident but its value in a color receiver is distinctly enhanced due to the fact that improper tuning of a color receiver manifests itself in incorrect colors, or even a total lack of color, in the reproduced image.

Since the broadcast specifications of the Federal Communications Commission dictate vestigial sideband transmission, the assigned picture carrier frequency is located midway on the slope at the high end of the intermediate frequency (IF) bandpass characteristic. The AFC system is tuned to a reference or center frequency corresponding to this desired picture IF frequency and so long as the tuning is reasonably close, i.e., within the response of the AFC system, an error voltage is developed to correct the tuning. With arrangements of the prior art, however, under a poor tuning condition resulting in an actual picture IF higher than the desired value, the AFC system develops one component of error voltage in response to the picture carrier and another component of error voltage from the sound carrier of the channel that is sought to be tuned in. These components of error voltage are of opposite polarity and tend to defeat the corrective effect of the AFC system; indeed they undesirably restrict the pull-in range over which the AFC is effective. In extreme cases, the AFC system may even lock to the sound carrier rather than to the picture carrier of the desired channel which obviously is an intolerable result.

In the AFC system described and claimed by Roy F. Baker in U.S. Pat. No. 3,459,887, issued Aug. 5, 1969, and assigned to the assignee of the present invention, this problem is remedied by forward biasing one diode of the usual discriminator network and reverse biasing the other diode. The error voltages derived from the positive and negative detectors when the receiver is grossly mistuned are of the same polarity and aid one another in obtaining an augmented composite control effect. Unfortunately, it is undesirable to utilize that AFC system in a receiver having a varactor tuning system because the varactor devices are extremely sensitive to the small d-c voltage changes likely to result from variations in the bias applied to the discriminator diodes. These bias variations are entirely unrelated to any desired control effect, and consequently any benefits derived by including the AFC system may be cancelled by the deleterious results of a false control effect on the varactor tuning system.

SUMMARY OF THE INVENTION

Accordingly, it is an object of the present invention to provide an improved AFC system for a television receiver.

It is a specific object of the invention to provide an AFC system for a television receiver which has a larger effective pull-in range than like systems of the prior art.

It is a further specific object of the invention to improve the AFC system of a television receiver to minimize the possibility of locking to the sound carrier rather than the picture carrier of the desired channel.

Another more specific object of the invention is to provide an AFC system, deriving a desired frequency response characteristic from a discriminator network having non-biased rectifier arrangements with differential conduction thresholds, compatible with varactor tuning systems.

Hence, the invention provides an AFC system for a television receiver having a varactor tuner for selecting a particular broadcast channel comprising a video modulated carrier and an audio modulated carrier having a fixed frequency separation from one another and for deriving therefrom an intermediate frequency signal having video and audio components of desired respective values. The AFC system comprises means, including a discriminator network having a pair of output terminals and a pair of non-biased rectifier arrangements with differential conduction threshold levels coupled to opposed terminals of the network, responsive to the intermediate frequency signal of the receiver for developing a first control effect of a predetermined polarity and of a magnitude dependent upon deviation in a predetermined direction of the actual frequency of the video IF component from its desired value and for concurrently developing a second control effect of the same polarity and of a magnitude dependent upon deviation in the aforesaid predetermined direction of the actual frequency of the audio IF component from its desired value. Means are provided for utilizing both of these control effects to control the operating frequency of a varactor tuned input stage to maintain the frequencies of the video and audio IF components at their respective desired values.

In its preferred form, the invention employs a discriminator network driving a pair of non-biased rectifier arrangements provided with individual load circuits. The AFC or error voltage is the net voltage attained in combining the outputs of these rectifiers in series opposition in the usual way. The frequency response characteristic of the discriminator network is shaped as required to accomplish derivation of the aforementioned first and second control effects of like polarity by including a multiplicity, preferably three, of serially connected diodes in one of the rectifier arrangements. The multiplicity of serially connected diodes vary the conduction threshold of the positive portion of the discriminator network to assure a proper shaping.

DESCRIPTION OF THE DRAWINGS

The features of the present invention which are believed to be novel are set forth with particularity in the appended claims. The invention, together with further objects and advantages thereof, may be best understood by reference to the following description taken in conjunction with the accompanying drawings, in the several figures of which like reference numerals identify like elements, and in which:

PREFERRED EMBODIMENT OF THE INVENTION

Figure 1:
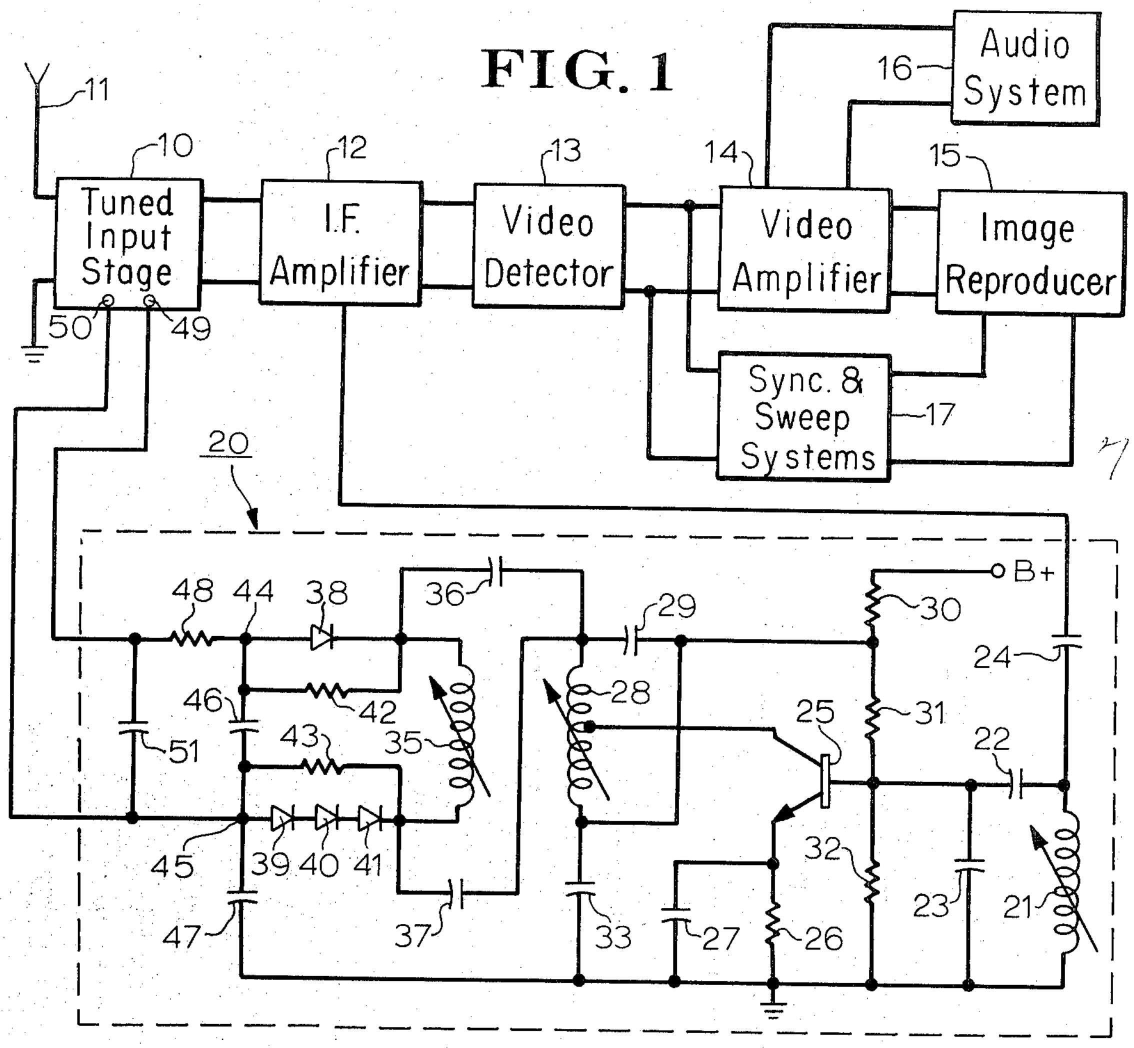
FIG. 1 is a schematic representation, partially in the form of a block diagram, of a television receiver including an AFC system constructed in accordance with the subject invention.

Referring now more particularly to FIG. 1, the arrangement there represented is a television receiver of the intercarrier type having a varactor tuned input stage although the invention is applicable to any receiver employing the principle of superheterodyne reception. Moreover, the representation is of only those portions of the receiver that are used in monochrome reproduction even though the AFC system to be described is the same in structure, operation and connection with the remaining major components of the receiver whether the instrument be for monochrome or color reproduction. The representation selected leads to simplification of the drawing and is not considered as a restriction on the application of the invention.

The receiver has a varactor tuned input stage 10 having input terminals connected to a wave signal antenna 11. This stage includes a varactor tuned RF amplifier, a varactor controlled variable frequency heterodyne oscillator and a varactor controlled mixer for selecting a particular broadcast channel from the several channels that are usually available in a given location. Each such channel is made up of a video modulated carrier and an audio modulated carrier having a fixed frequency separation of 4½ megahertz from one another. The function of the input stage is to derive from the selected channel an intermediate frequency signal having video and audio components of desired respective values for application to an IF amplifier 12 of any desired number of stages. The amplified IF signal is detected in a video detector 13 and the detected output is delivered to video amplifier 14 wherein the video frequency components are further amplified for application to an image reproducer 15.

In accordance with intercarrier practice, an intercarrier component comprising a carrier of 4½ megahertz frequency modulated with audio is developed in video detector 13 and separated in a suitable frequency selective load included in video amplifier 14. The intercarrier component is supplied to a conventional audio system 16.

Image reproduction in unit 15 requires deflection of a cathode-ray beam to scan a two-dimensional image screen in synchronism with scanning that takes place at the transmitter in developing the program signal. This control of the image reproducer is afforded by a synchronizing and sweep system 17 coupled to the output of video detector 13 in order to be timed by the synchronizing components of the received video signal.

An AFC system 20 has an input coupled to an output terminal of IF amplifier 12 and outputs coupled to the varactor tuning elements of input stage 10. This unit embodies the invention and will be described in detail presently.

Aside from AFC system 20, the described arrangement is a television receiver of conventional design and construction, the operation of which is well understood in the art and need not be further amplified. Accordingly, attention will be directed to the specifics of AFC system 20.

This system comprises means, including a frequency modulation detector responsive to the IF signal of the receiver, for developing a first control effect of a predetermined polarity and of a magnitude dependent upon deviation in a predetermined direction of the actual frequency of the video IF component from its desired value and for concurrently developing a second control effect of the same predetermined polarity and of a magnitude dependent upon the deviation in the same predetermined direction of the actual frequency of the audio IF component from its particular desired value. Structurally, the AFC system has an input including an adjustable inductor 21 and capacitors 22, 23, collectively defining a selector that is tuned to the IF frequency. A coupling capacitor 24 connects the tuned input preferably to the last stage of IF amplifier 12 before detection. The input selector connects to the base of a driving transistor 25 which has an emitter coupled to ground through a resistor 26 bypassed by a capacitor 27. The collector of transistor 25 connects to a tap on an adjustable inductor 28 tuned by a capacitor 29. Operating potentials are applied to transistor 25 from a source designated B+ through series connected resistors 30, 31 and 32. The junction of resistors 30 and 31 is bypassed to ground by a capacitor 33 and connects through the tap of inductor 28 to the collector while the junction of resistors 31 and 32 connects with the base of the transistor.

Another variable inductor 35 is magnetically coupled to inductor 28 and is tuned by capacitors 36 and 37 the common terminal of which connects to the high potential terminal of inductor 28. Tuned circuits 28-29 and 35-37 constitute a known form of discriminator network having tunable primary and secondary circuits. A pair of rectifier arrangements, here shown as a single diode 38 and a string of three serially-connected diodes 39, 40, 41, are connected to the output terminals of the discriminator network; in particular, the cathode end of each diode arrangement connects to an output terminal of secondary 35–37. Resistors 42 and 43 provide load circuits for the diodes and the AFC or error voltage is available across terminals 44 and 45, as the net voltage developed across the diode loads in series opposition. The output terminals are RF bypassed to ground by capacitors 46, 47, while output terminal 44 is coupled through a resistor 48 to one input 49 and the other output terminal 45 is connected directly to the second input 50 of varactor tuned input stage 10. Resistor 48 and capacitor 51 combine to provide a low pass filter for d-c feedback to the varactors. The connections from output terminals 44 and 45 to the varactor tuned input stage 10 constitute means for utilizing both of the control effects developed in the AFC system, in a manner to be described hereafter, to maintain the frequencies of the video and audio components at their desired respective values.

Figure 2:
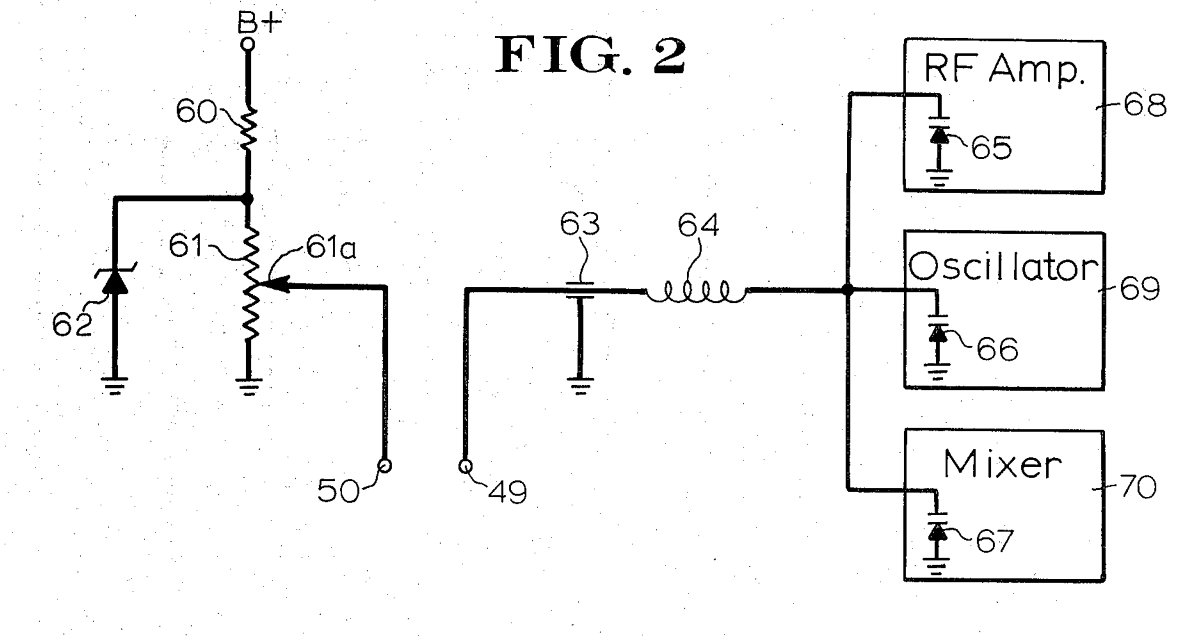
FIG. 2 is a schematic representation of a varactor tuned input stage that may be employed in the receiver of FIG. 1.

A varactor tuned input stage that may be controlled by the desired AFC system is represented in FIG. 2. Therein, a resistor 60 and a tuning potentiometer 61 are serially connected between a source designated B+ and ground. To assure that a constant potential is maintained across the terminals of potentiometer 61, a Zener diode 62 connects the junction at the connection of the resistor and the potentiometer to ground. Ignoring for the present time the AFC error voltage applied to input terminals 49 and 50, a d-c control voltage determined by the positioning of potentiometer wiper 61*a* is applied through a feedthrough capacitor 63 and an inductor 64 to varactor diodes 65, 66, 67, in the tuned circuits of the RF amplifier, oscillator and mixer stages 68, 69, 70, respectively, which are interconnected (not shown) in the well-known manner. The level of d-c voltage applied to the varactors controls these stages in a manner making possible the selection of a desired broadcast channel. Error voltages developed in the AFC system in the face of frequency deviations of the video IF carrier and the audio IF carrier from their respective desired values are applied to terminals 49 and 50. Accordingly, the normal operating bias of the varactors are modified both in direction and amount to maintain the desired frequencies of the video and audio IF components.

In considering the operation of the described AFC system, reference is made to the curves of FIG. 3. The curve of FIG. 3a is a generally idealized band pass characteristic of IF amplifier 12 from which it appears that the picture carrier is 6*db* down on the slope at the high frequency end of the band. The sound carrier on the other hand is in the trap at the low end of the band, usually in the order of 24*db* or greater. These carriers, in accordance with current practice, occur at 45.75 and 41.25 megahertz respectively.

The trap for the sound carrier of the adjacent higher broadcast channel falls at 47.25 megahertz and the frequency representing the picture carrier of the lower adjacent channel is at 39.75 megahertz. In conventional AFC systems utilizing non-biased but balanced diode networks, the response of the FM detector to the output of the IF amplifier is that shown by the curve of FIG. 3*b*. The customary zero response or center reference frequency $f_0$ of the AFC system corresponds to the desired frequency of the video IF component and the response is symmetrical about this point over a deviation range $\Delta f$. Within this range, the error voltage of the AFC system has a polarity which is determined by the sense and an amplitude which is proportional to the extent of frequency deviation of the video IF component from the reference or zero response of the AFC system. The application of the error voltage to a heterodyning oscillator of the tuned input stage adjusts the operating frequency of that oscillator to maintain the picture carrier at its desired value in a fashion that is well understood in the art. So long as the receiver is tuned within or relatively close to the range $\Delta f$, the AFC system is able to correct imperfections in tuning.

Figure 3A:
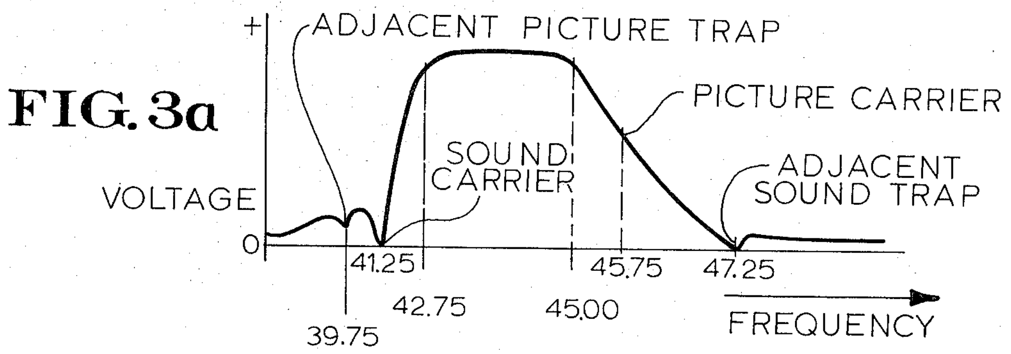
FIGS. 3a–3d are curves employed in describing operating characteristics of the receiver in FIG. 1.
Figure 3B:
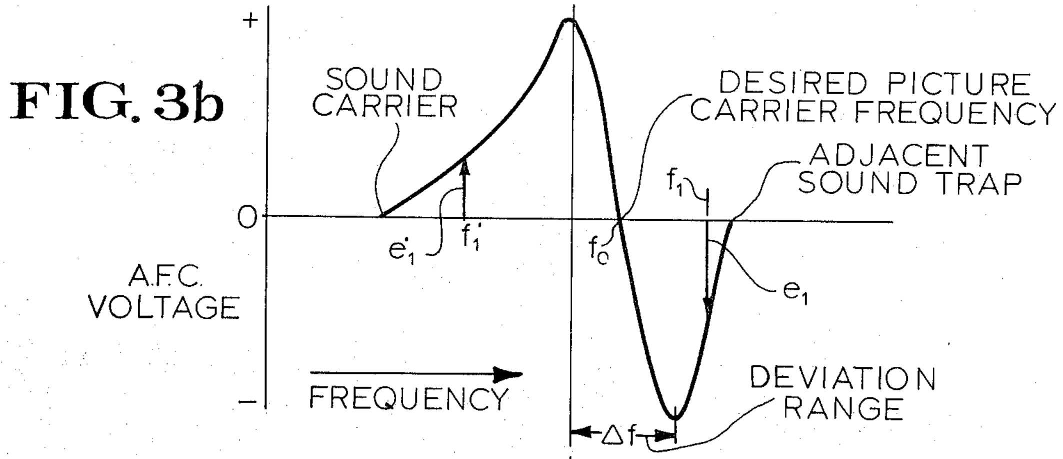

For gross errors in tuning which result in deviations beyond the range of $\Delta f$, the error voltage decreases with the degree of mistuning, falling more rapidly toward the high frequency end than toward the low frequency end of the IF band pass as reflected by the curve of FIG. 3*b*. It is this property of conventional AFC systems that leads to the possibility of locking on the sound carrier as distinguished from the picture carrier of a channel that is being tuned.

In explaining the operation of the AFC system in this respect, let it be assumed that the receiver tuning has caused an actual frequency of the video IF component above the band $\Delta f$ at a value $f_1$. The arrow $e_1$ designates the component of error voltage developed in the AFC system in response to the video IF components; it is of negative polarity. For the same operating condition, the sound IF component has an actual frequency at the value $f_1'$, since the video and audio signals have a fixed frequency separation, in the response of the AFC system to the audio component is shown by the arrow $e_1'$. It is of positive polarity and reduces the net error voltage developed in the AFC system when, in fact, a greater correcting voltage is desired to restore proper conditions of tuning. It will be apparent that for still greater degrees of mistuning, yielding still higher values of actual frequencies of the video and audio components, a condition may be reached in which the amplitude of the component of error voltage $e_1'$ is equal to that of component $e_1$. Since these components have opposite polarities, the net error voltage ultimately becomes zero and this limits the pull-in range of the AFC system. For greater degrees of mistuning, component $e_1'$ exceeds the value of component $e_1$ giving a net positive AFC voltage which increases, rather than decreases, the operating frequency of the varactor tuned input stage. This increases the frequency deviation still further and has a regenerative effect, further increasing the operating frequency of the heterodyne oscillator until finally the actual frequency of the sound component falls at the referenced frequency $f_0$. This is the undesired condition of locking to the sound carrier which typifies conventional AFC systems of the prior art.

Figure 3C:
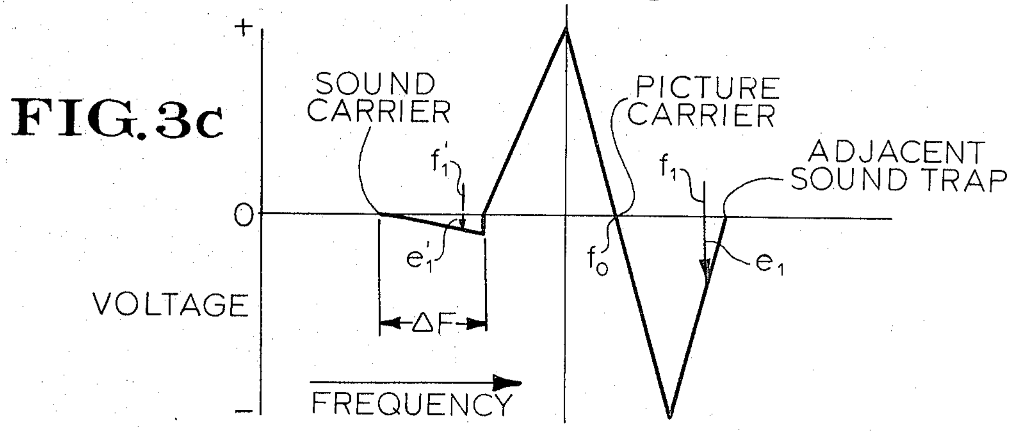

The curve of FIG. 3*c* represents, in idealized form, the frequency response of a discriminator that would minimize this deficiency of prior arrangements. For the same assumed frequencies of video and sound components, designated $f_1$ and $f_1'$, the error voltages $e_1$ and $e_1'$ are now of like polarity and aid one another. The net error voltage is enhanced and, being of negative polarity, reduces the operating frequency of the varactor tuned heterodyne oscillator in the input stage as required to establish proper conditions of tuning. This has the effect of increasing the useful pull-in range of the AFC system and assures against locking to the sound carrier of the broadcast channel being tuned so long as the initial conditions of tuning give rise to an actual frequency of the audio IF component within range $\Delta F$ over which the discriminator curve has a negative slope.

Figure 3D:
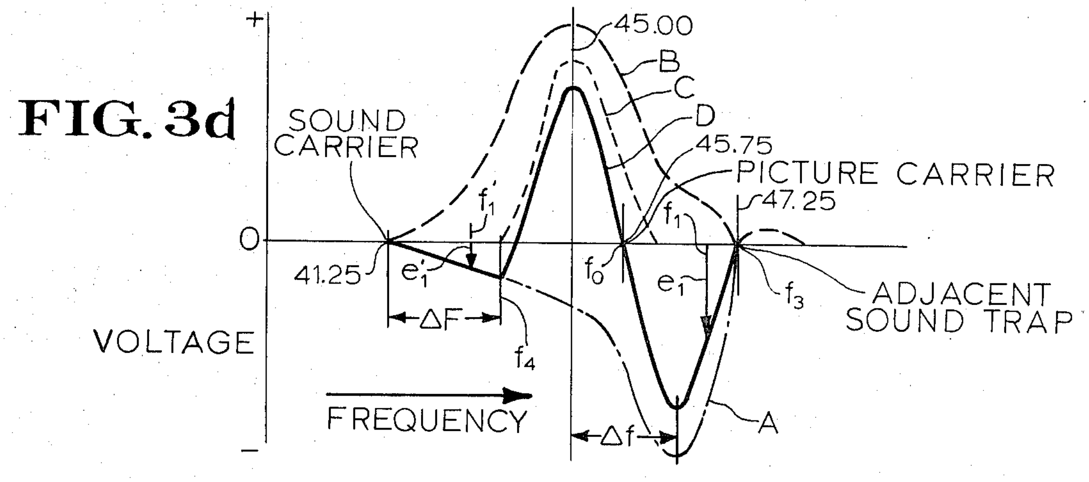

A close approximation to the idealized curve of FIG. 3*c* is that of curve D in FIG. 3*d*. It results from the effect of the differing conduction threshold levels between diode 38 and the arrangement comprising diodes 39, 40, 41.

The unbiased response of diode 38 to the IF signal is that of curve A, while curve B is representative of the expected response if the diode arrangement 39, 40, 41, were replaced by a single unbiased diode. The effect of replacing a single diode by three diodes in a series arrangement is to modify the conduction threshold of the diode arrangement and hence its response as illustrated in curve C. The sum effect of the response of curve A and curve C is that designated by curve D.

For any tuning condition in which both the video and sound IF components fall within the IF pass band characteristic, the AFC system derives a first control effect in response to the video IF component and a second control effect in response to the sound IF component. The variation of the first control effect with frequency deviation has a predetermined slope, specifically a negative slope, over a range $\Delta f$ centered about the desired frequency $f_0$ of the video IF component but has an opposite or positive polarity for frequency deviations which extend from the high point of this range toward the IF frequency $f_3$ which approximately represents the sound carrier of the adjacent broadcast channel. With respect to the second control effect, its variation with deviations and frequency has a negative slope over another frequency range $\Delta F$ extending from the desired frequency of the audio component to higher frequencies. This range $\Delta F$ is at least approximately equal to, and preferably exceeds, the spacing of the desired frequency $f_0$ of the video IF component from IF frequency $f_3$. Expressed differently, this range is about half the frequency spacing of the desired values of the video and sound IF carriers. If it is at least this large or larger and if the magnitude of the second control effect varies proportionally with deviation as indicated in curve D, the net error voltage for deviations in frequency of the picture IF component above the range $\Delta f$ is greater than achieved with prior AFC systems and increases the pull-in range of the system.

The portion of the discriminator characteristic of FIG. 3*d* immediately adjacent the desired frequency of the audio component and from which the aforesaid second control effect is derived results from the inclusion of three diodes in one of the rectifier arrangements and the attendant increase in conduction threshold. The frequency $f_4$ at which the response of the AFC system to the sound carrier reaches its minimum value and changes its slope can to some extent be determined by adding or subtracting diodes to change the point in curve C of FIG. 3d at which the diode arrangement conducts. Fine-tuning of the frequency $f_4$ to a desired point may then be accomplished by tuning the discriminator network, especially the primary thereof. Proper adjustment assures that AFC system has a symmetrical pull-in range. Experience has determined that the described system is capable of providing a pull-in range of ± 1.8 megahertz whereas the pull-in range of conventional AFC systems is less than +1 and −2 megahertz.

One embodiment of the AFC system that has been constructed and successfully utilized employed the following circuit components which are given by way of illustration and not limitation of the invention:

| | | | |
|---|---|---|---|
| Resistor: | | | |
| | 26 | ohms | 220 |
| | 30 | do | 100 |
| | 31 | do | 10,000 |
| | 32 | do | 1,000 |
| | 42 and 43 | do | 100,000 |
| | 48 | do | 10,000 |
| Capacitor: | | | |
| | 22 | pf | 5 |
| | 23 | pf | 100 |
| | 24 | pf | 0.2 |
| | 27 | pf | 1,000 |
| | 29 | pf | 6 |
| | 33 | pf | 1,000 |
| | 36 | pf | 33 |
| | 37 | pf | 33 |
| | 46 | pf | 1,000 |
| | 47 | pf | 1,000 |
| | 51 | mfd | 1 |
| Diodes 38, 39, 40, 41 | | Type | FD100 |
| Transistor: | | | |
| | 25 | Type Fairchild | SE5025 |
| Bias source B+ | | volts DC | 24 |

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a television receiver having a tunable input stage of the varactor type for selecting a particular broadcast channel comprising a video modulated carrier and an audio modulated carrier having a fixed frequency separation from one another and for deriving therefrom an intermediate frequency signal having video and audio IF components of desired respective values, an automatic frequency control system comprising:

means including a discriminator network having a pair of output terminals and a pair of non-biased rectifier arrangements with different conduction threshold levels individually connected to respective ones of said output terminals of said network, said means being responsive to said intermediate frequency signal for developing a first control effect at one of said output terminals of a predetermined polarity and of a magnitude dependent upon deviation in a predetermined direction of the actual frequency of said video IF component from its aforesaid desired value, and for concurrently developing a second control effect at the other of said output terminals of the same predetermined polarity and of a magnitude dependent upon deviation in said predetermined direction of the actual frequency of said audio IF component from its aforesaid desired value;

means coupling said output terminals to said tunable input stage; and means for utilizing both of said control effects to control said varactor tunable input stage and maintain the frequencies of said video and audio IF components at their aforesaid desired values.

2. An automatic frequency control system in accordance with claim 1 wherein one of said non-biased rectifier arrangements includes a single diode and the other of said non-biased rectifier arrangements comprises a multiplicity of serially connected diodes for developing said different conduction threshold levels to shape the frequency response characteristic of said discriminator network in a manner required to accomplish derivation of said first and second control effects of like polarity.

3. An automatic frequency control system in accordance with claim 2 wherein said multiplicity of serially connected diodes comprises three diodes.

4. An automatic frequency control system in accordance with claim 1 wherein said non-biased rectifier arrangements have load circuits coupled in series opposition to one another for developing said first and second control effects.

5. An automatic frequency control system in accordance with claim 1 wherein the magnitude of said second control effect is proportional to the deviation of the actual frequency of said audio component from its desired value.

6. An automatic frequency control system in accordance with claim 1 wherein the second control effect is derived over a range of frequency deviations of said audio IF component which is approximately equal to half the frequency spacing of said desired frequencies of said video IF component and said audio IF component.

7. An automatic frequency control system in accordance with claim 1 wherein the magnitude of said first control effect increases proportionally with deviations to a maximum value at a given frequency between said desired frequency of said video IF component and another IF frequency representing the sound carrier of the adjacent broadcast channel and decreases to zero as the frequency of said video IF component approaches said second IF frequency, and further in which the magnitude of said second control effect increases proportionally with deviations of said audio IF component which accompany deviations of said video IF component between said given frequency and said IF frequency.

8. An automatic frequency control system in accordance with claim 7 wherein the magnitude of said second control effect decreases toward zero for still greater deviations in frequency of said audio IF component.

9. An automatic frequency control system in accordance with claim 1 wherein variations of said first control effect with frequency deviation has a predetermined slope over a predetermined range centered about said desired video IF frequency but has an opposite slope for deviations from the highest amplitude frequency point of said range to another IF frequency representing the sound carrier of the adjacent broadcast channel, further in which varitions of said second control effect with frequency deviation has said predetermined slope over another range extending from said desired audio IF frequency to higher frequencies, and in which the frequency span of said other range is at least approximately equal to the frequency spacing of said desired video IF frequency from said other IF frequency.

* * * * *